(12) United States Patent
Brown

(10) Patent No.: US 12,722,727 B2
(45) Date of Patent: Sep. 1, 2026

(54) TRANSPORTABLE FOLDING STORAGE APPARATUS FOR REMOVABLE VEHICULAR DOORS AND HARDTOP ROOFS

(71) Applicant: Andrew Brown, Pensacola, FL (US)

(72) Inventor: Andrew Brown, Pensacola, FL (US)

( * ) Notice: Subject to any disclaimer, the term of this patent is extended or adjusted under 35 U.S.C. 154(b) by 375 days.

(21) Appl. No.: 18/392,066

(22) Filed: Dec. 21, 2023

(65) Prior Publication Data

US 2024/0239427 A1 Jul. 18, 2024

Related U.S. Application Data

(60) Provisional application No. 63/438,944, filed on Jan. 13, 2023.

(51) Int. Cl.

| | |
|---|---|
| ***F16M 11/00*** | (2006.01) |
| ***B62D 63/06*** | (2006.01) |
| ***F16M 11/10*** | (2006.01) |
| ***F16M 11/20*** | (2006.01) |

(52) U.S. Cl.

CPC .......... *B62D 63/061* (2013.01); *F16M 11/10* (2013.01); *F16M 11/2014* (2013.01)

(58) Field of Classification Search

CPC .. B62D 63/061; F16M 11/10; F16M 11/2014; F16M 11/42; B25H 5/00

See application file for complete search history.

(56) References Cited

U.S. PATENT DOCUMENTS

| | | | | |
|---|---|---|---|---|
| 4,795,075 | A * | 1/1989 | Pigott | B62D 65/02 219/80 |
| 7,185,899 | B2 * | 3/2007 | Thiede | A47B 46/00 280/47.35 |
| 8,348,287 | B1 * | 1/2013 | Smith | B62B 3/108 280/47.35 |
| 10,919,556 | B2 * | 2/2021 | Bush | B62B 3/16 |
| 11,654,947 | B1 * | 5/2023 | Poudrier | B62B 3/008 211/13.1 |
| 2022/0227439 | A1 * | 7/2022 | Broadwell | B25H 5/00 |

* cited by examiner

*Primary Examiner* — Amy J. Sterling

(57) ABSTRACT

A reconfigurable apparatus used to store removable vehicular doors, roofs, roof components and hitch accessories. A rolling frame supports pivoting door storage arms, removable roof storage framework components and tubes for storage of hitch accessories. Components can be reconfigured to allow for compact storage and/or vehicular transportation of the apparatus itself.

13 Claims, 10 Drawing Sheets

TRANSPORTABLE FOLDING STORAGE APPARATUS FOR REMOVABLE VEHICULAR DOORS AND HARDTOP ROOFS

CROSS-REFERENCE TO RELATED APPLICATIONS

Claims benefit of provisional prior application Ser. No. 63/438,944 filed Jan. 13, 2023.

BACKGROUND

Field of Invention

The invention pertains to a storage apparatus for removable vehicular doors and hardtop roofs. More specifically, the removable vehicular component storage apparatus can be reconfigured to a smaller size when not in use to aid in compact storage and/or transport of the apparatus itself.

Background

Some attempted solutions have tried to provide storage for one type of removable vehicular component, but this has not sufficiently addressed the needs of users due to its lack of adaptability.

Some attempted solutions have tried to provide a storage apparatus, but this has not sufficiently addressed the needs of users due to its awkward size and lack of transportability.

SUMMARY OF THE INVENTION

The present invention provides a means of storage for removable vehicular components, namely doors and hardtop roofs, such as those available on Sport Utility Vehicles like the Jeep Wrangler. The storage apparatus allows for the storage of up to four doors, a single hardtop roof, and up to two removable individual hardtop roof panels like "Freedom Panels" found on several iterations of late model Jeep vehicles. Furthermore, a multitude of trailer hitches or trailer hitch mounted accessories can be stored in the apparatus.

The apparatus' lower base frame is supported by rollable caster wheels, allowing for ease of localized transport when in use and when in storage. When not in use for door or hardtop roof storage, the apparatus can be temporarily reconfigured in a way such that it's footprint and volumetric space requirements can be reduced to aid in compact storage. Furthermore, when reconfigured or folded into its compact state for storage, the apparatus can be transported by any vehicle with a standard front or rear mounted hitch. This feature of the present invention is advantageous to users as the storage apparatus can be transported to any desired location, and the vehicle's removable components can there be removed and stored upon the properly configured apparatus as desired.

BRIEF DESCRIPTION OF DRAWINGS

In the following drawings, which form a part of the specification and which are to be construed in conjunction therewith, and in which like reference numerals have been employed throughout wherever possible to indicate like parts in the various views.

A DETAILED DESCRIPTION

Figure 1:
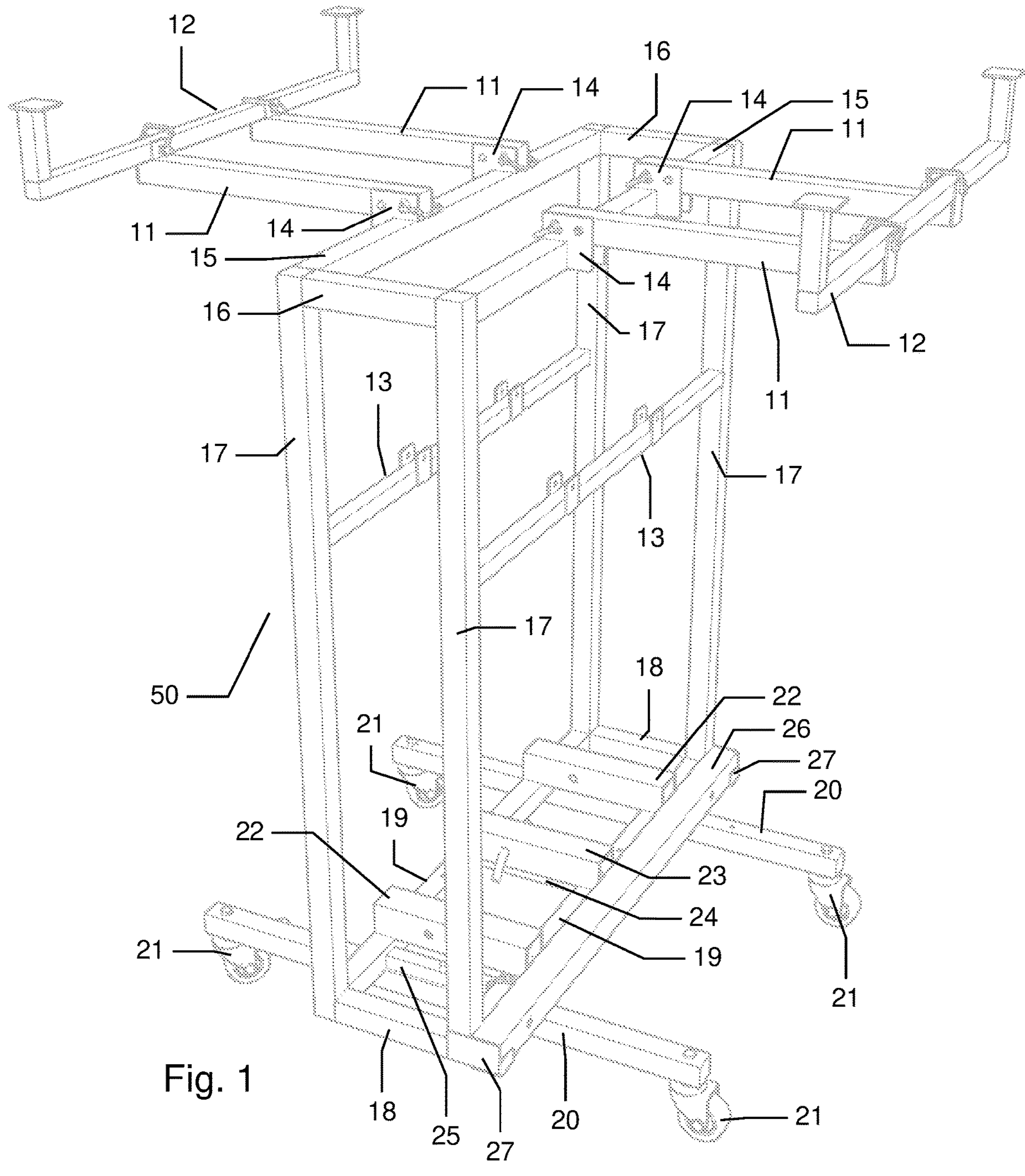
FIG. 1 is a perspective view of a vehicular doors and hardtop roof storage apparatus in the out-folded configuration ready for storage of appurtenances.
Figure 2:
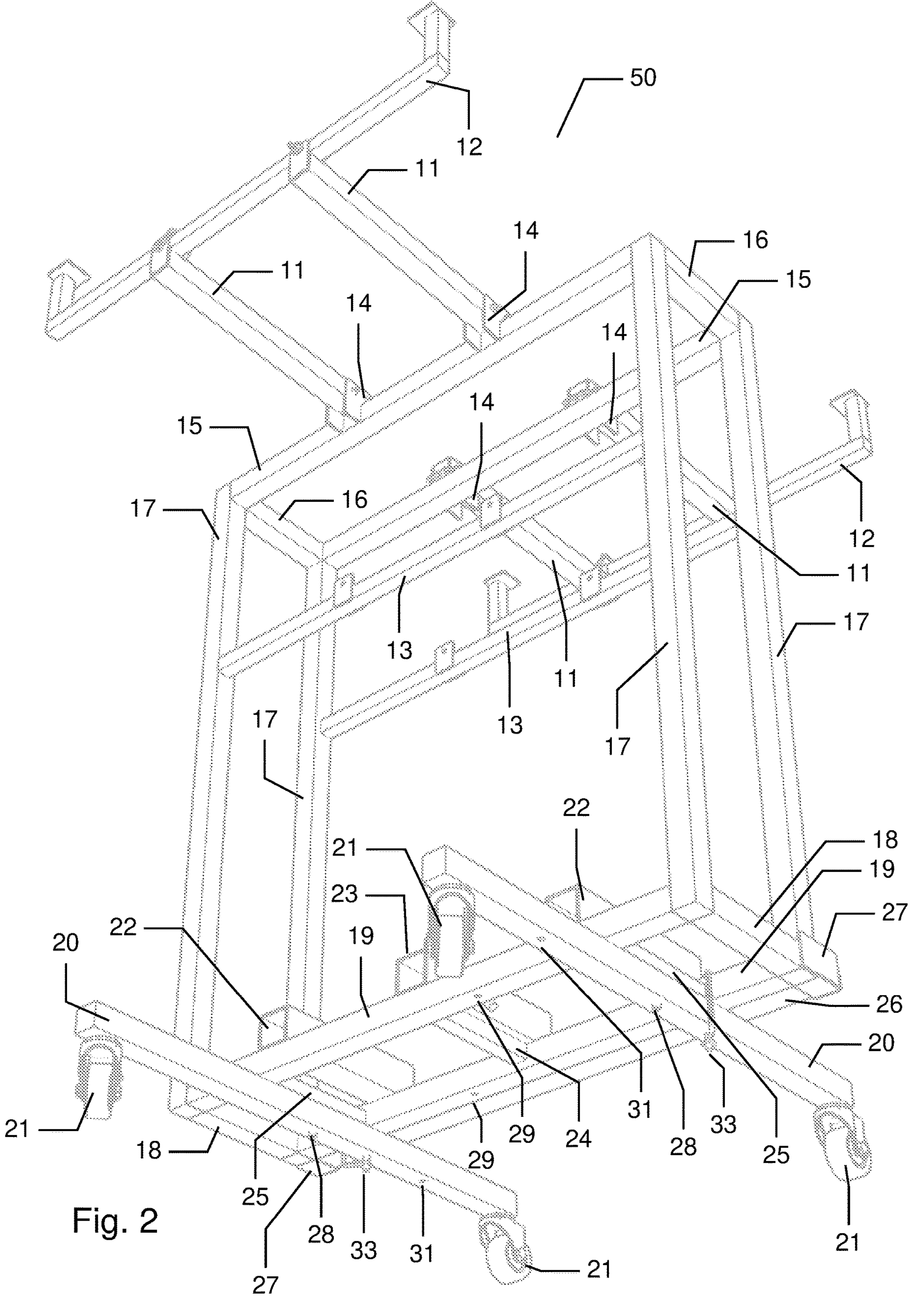
FIG. 2 shows another view of the storage apparatus in the out-folded configuration ready for storage of appurtenances.

As shown in FIGS. 1 through 10 of the drawings, one exemplary embodiment of the present invention is generally shown as a Transportable Folding Storage Apparatus for Removable Vehicular Doors and Hardtop Roofs 50. The storage apparatus includes folding door storage arms 11 that may host removable hardtop roof storage brackets with vertical standoffs 12. The general framework of the storage apparatus comprised of permanently affixed top main frame members 15, top cross frame members 16, vertical corner frame members 17, bottom main frame members 19 and bottom cross frame members 18, 24 and 25 which bears on pivotally connected base leg members 20 with rollable caster wheels 21, two or more of which may be of the locking type.

Figure 5:
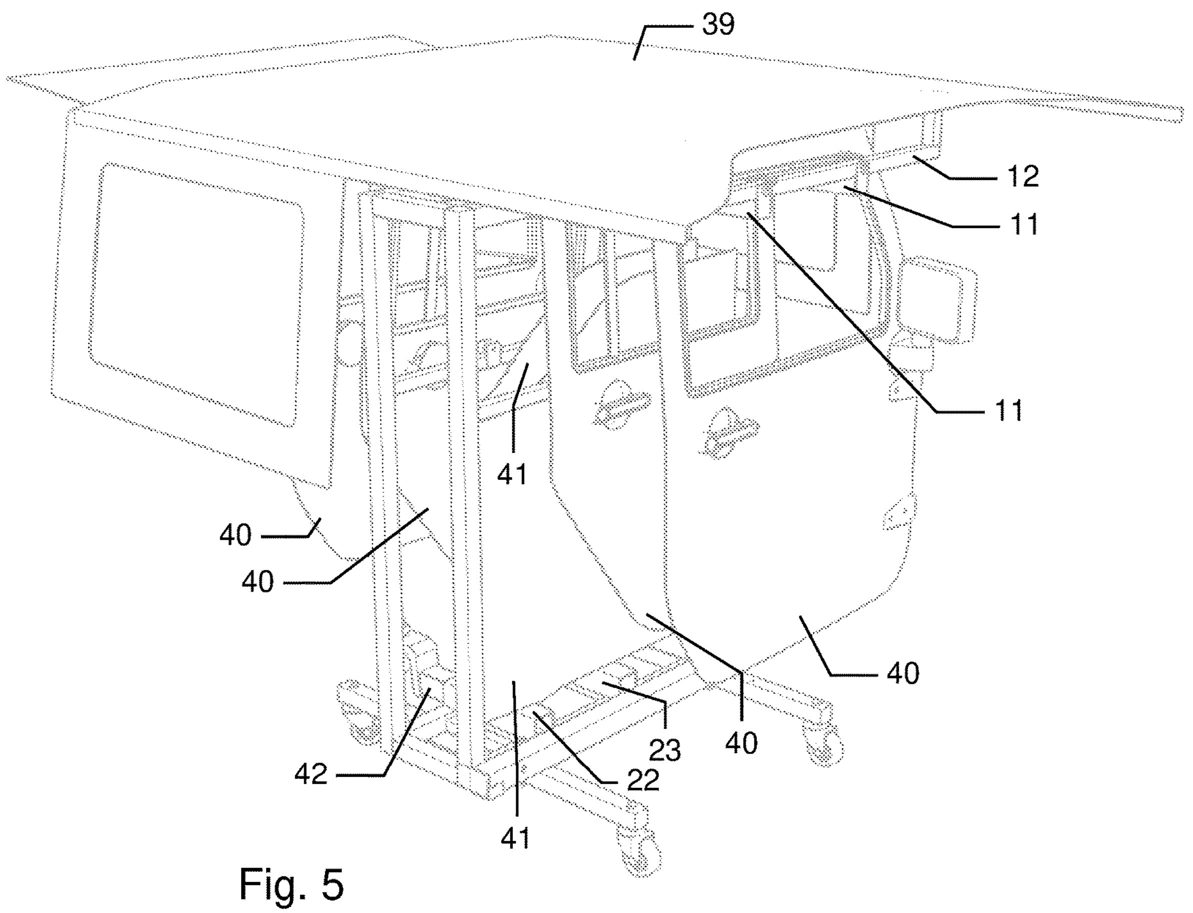
FIG. 5 is a perspective view of a vehicular doors and hardtop roof storage apparatus in the out-folded configuration and shown storing four doors, a single hardtop roof, two removable hardtop roof panels and a possible multitude of trailer hitches.
Figure 6:
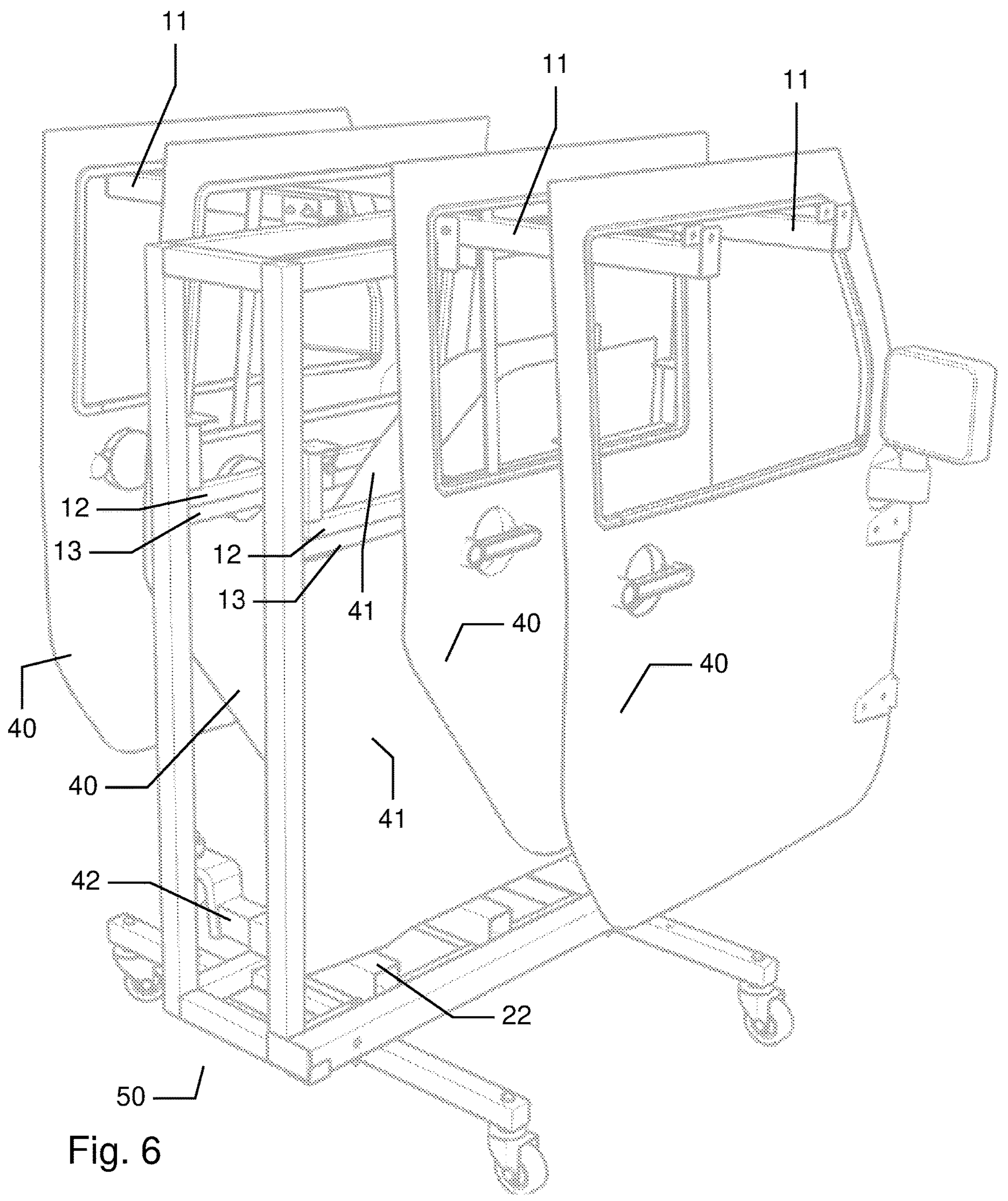
FIG. 6 is a perspective view of a vehicular doors and hardtop roof storage apparatus in the out-folded configuration and shown storing four doors, two removable hardtop roof panels and a possible multitude of trailer hitches.
Figure 7:
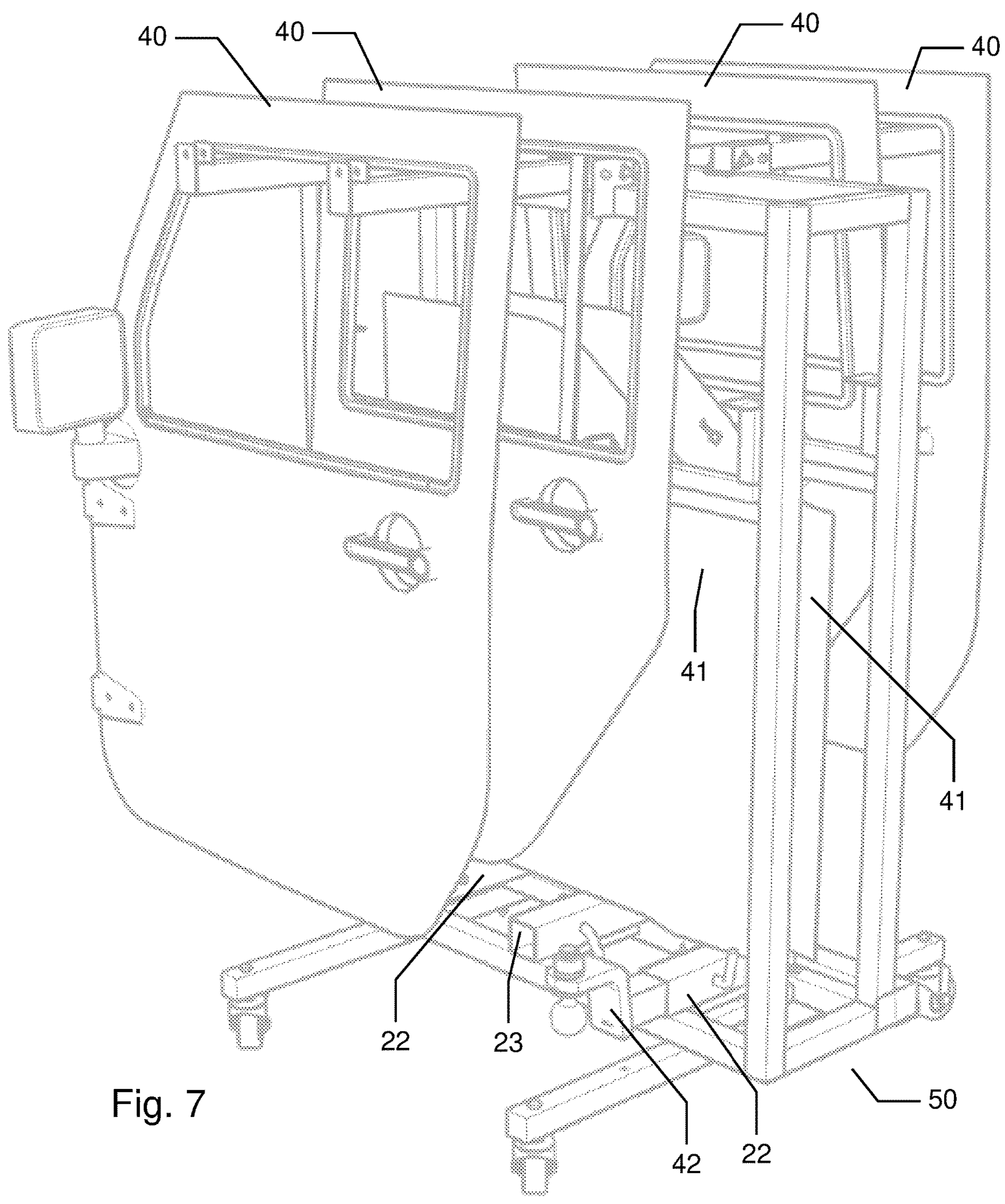
FIG. 7 shows another view of the storage apparatus in the out-folded configuration and shown storing four doors, two removable hardtop roof panels and a possible multitude of trailer hitches.

When configured in the out-folded position as to provide storage for removable vehicular doors and hardtop roofs as shown in FIGS. 1, 2 and 5-7, pivoting base leg members 20 are pivotally connected to bottom frame cross member 25 via the pivot point 28 and are positioned to be parallel to bottom frame cross member 25 which results in base leg members 20 "in-use" position locking holes 35 to be directly aligned with and adjacent to bottom main frame member 19 associated "in-use" position locking holes 34 so that "in-use" position removable pins 33 can be affixed. Removable hardtop roof panels 41 like Jeep "Freedom Panels" can be placed generally within the box frame structure created by top main frame members 15, top cross frame members 16, vertical corner frame members 17, bottom main frame members 19 and bottom cross frame members 18 and directly atop outer hitch and hitch accessory storage tubes 22 and inner hitch and hitch accessory storage tube and transportation hitch point 23. Folding door storage arms 11, which are able to rotate 90 degrees about a fixed pivot point located in the pivot locking bracket 14, are rotated to be affixed in the horizontal position using a removable pin inserted into a hole located behind and horizontally aligned with the fixed pivot point on the pivot locking bracket 14. When two adjacent properly spaced door storage arms 11 on the same side of the apparatus are affixed in the horizontal position, a bracket capable of holding one or two vehicle door(s) 40 is created. When all four door storage arms 11 are affixed in the horizontal position, two sets of door storage brackets are created, capable of storing up to four vehicle doors 40. Removable vehicular hardtop roof 39 can be stored on the apparatus with or without vehicle doors 40 stored on door storage arms 11. If vehicle doors 40 are being stored, they should be placed on the door storage arms 11 prior to placement of the hardtop roof, as the required installation of removable hardtop roof storage brackets with vertical standoffs 12 may impede the placing and removal of doors 40 on the door storage arms 11. This configuration is shown in FIGS. 6 and 7. Removable hardtop roof storage brackets with vertical standoffs 12 are placed within the positioning tabs located at the ends of a horizontally affixed pair of door storage arms 11, holes in the roof storage brackets 12 and the door storage arm positioning tabs 11 are aligned and affixed with a removable pin. With four door storage arms 11 affixed in the horizontal position and two removable hardtop roof storage brackets 12 affixed in place atop, vehicular hardtop roof 39 can be placed atop the four vertical standoffs provided by the installation of hardtop roof storage brackets 12. Trailer hitches and other hitch mounted accessories 42 can be placed in permanently affixed outer hitch and hitch accessory storage tubes 22 and inner hitch and hitch accessory storage tube and transportation hitch point 23. The fully out-folded configuration with all possible vehicular items in storage as intended is shown in FIG. 5.

Figure 3:
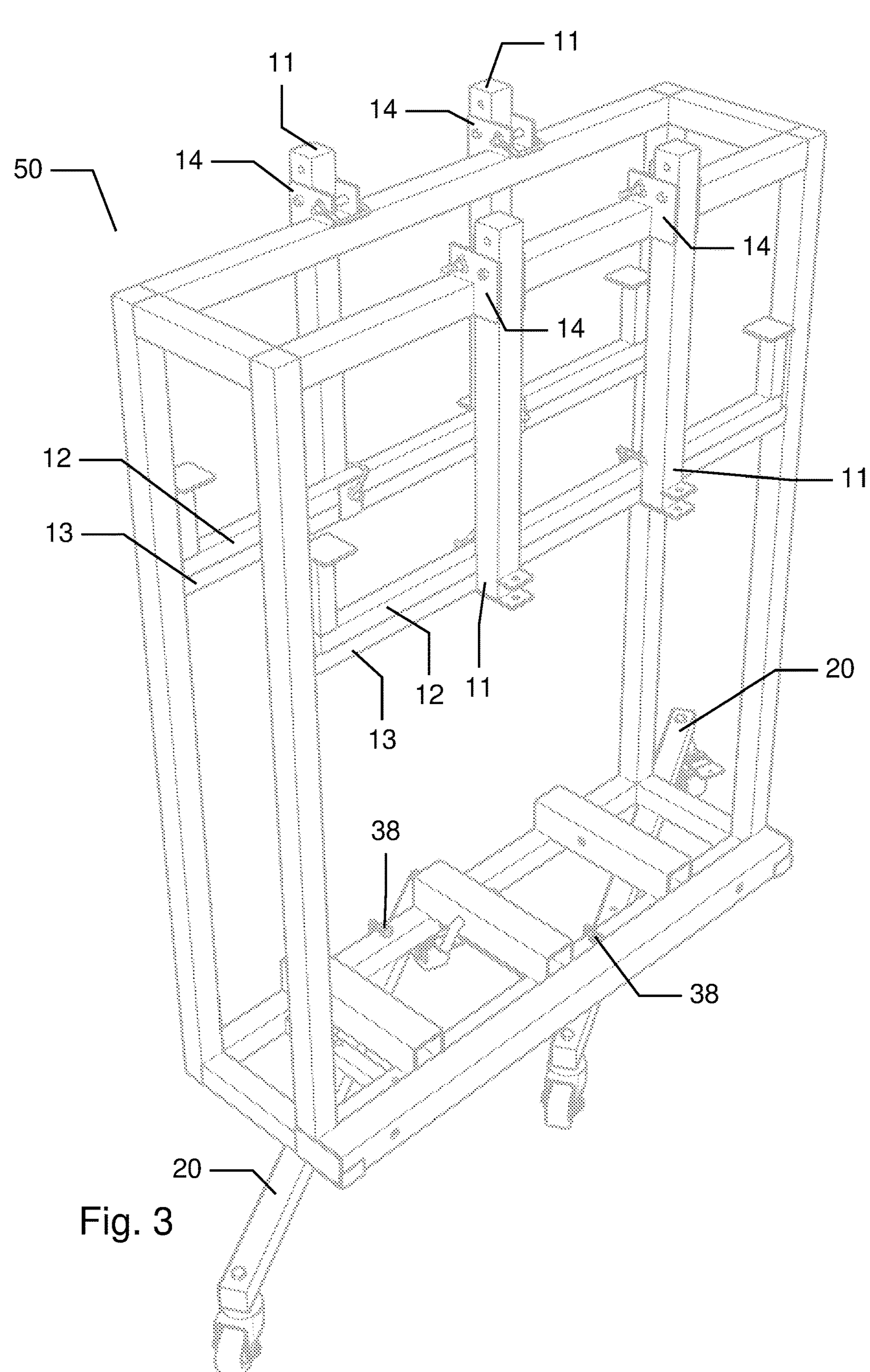
FIG. 3 is a perspective view of a vehicular doors and hardtop roof storage apparatus in the folded/compact configuration ready for self-storage or transportation.
Figure 4:
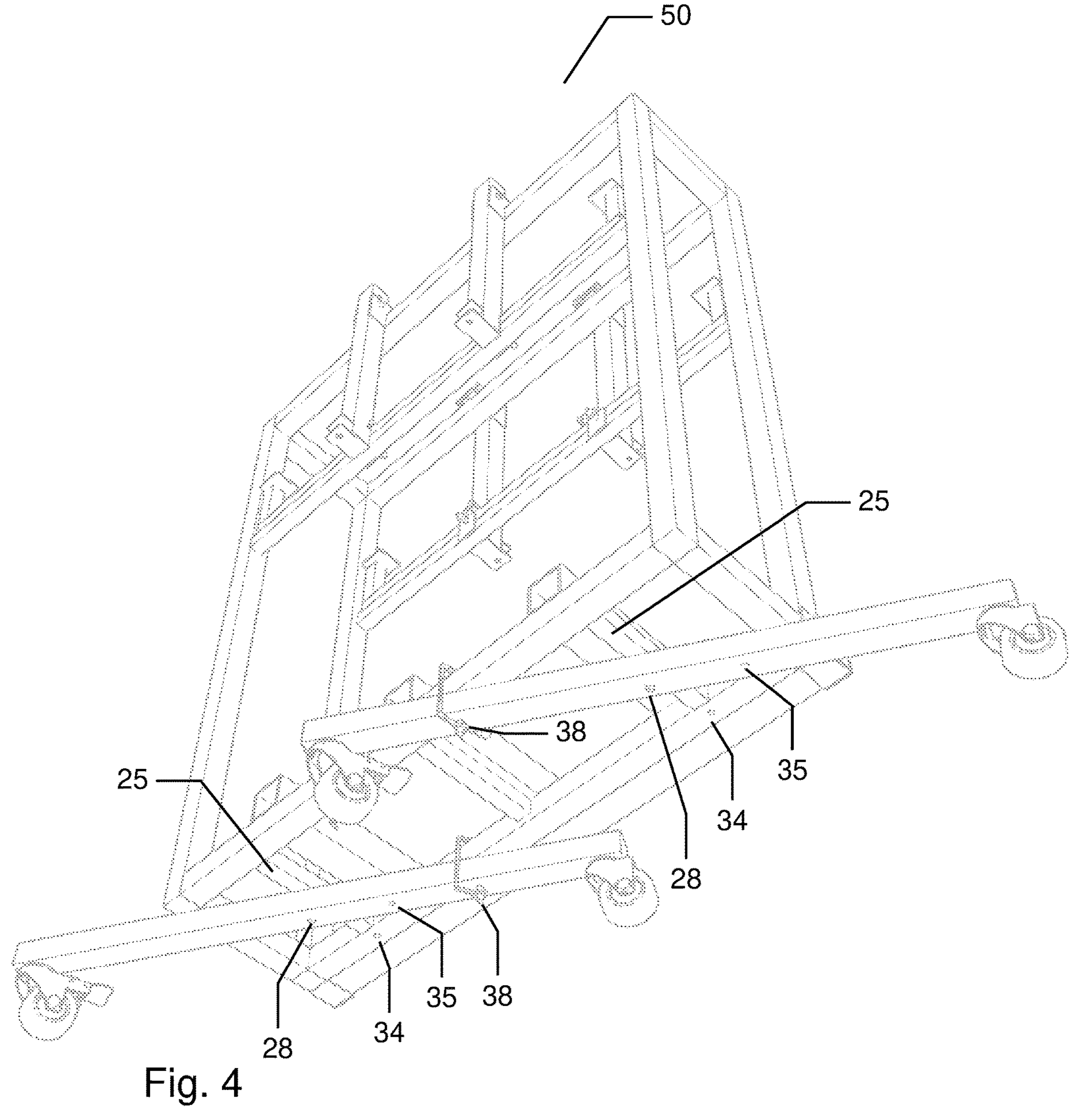
FIG. 4 shows another view of the storage apparatus in the folded/compact configuration ready for self-storage or transportation.

When configured in the folded/compact configuration ready for self-storage or transportation as shown in FIGS. 3 and 4, removable hardtop roof storage brackets with vertical standoffs 12 are removed from the positioning tabs located at the ends of a horizontally affixed pair of door storage arms 11 by first removing the pins and then lifting the hardtop roof storage brackets 12 away from the door storage arms 11. The Hardtop roof storage brackets 12 are then placed within positioning tabs on the roof bracket storage member 13 that also acts as a supplementary main frame member. Holes in the roof storage brackets 12 and the roof bracket storage member positioning tabs 13 are aligned and affixed with a removable pin. The door storage arms 11 are placed into storage position by removing the pin from the hole located behind and horizontally aligned with the fixed pivot point on the pivot locking bracket 14. Door storage arms 11 freely rotate down 90 degrees to the vertical position, and the pins are replaced in the locking hole located in the pivot locking bracket 14. "In-use" position removable pins 33 are removed from base leg members 20 enabling rotation about pivot point 28 such that base leg members 20 "in-storage" position locking holes 31 are directly aligned with and adjacent to bottom main frame members 19 associated "in-storage" position locking holes 29 so that "in-storage" position removable pins 38 can be affixed.

Figure 8:
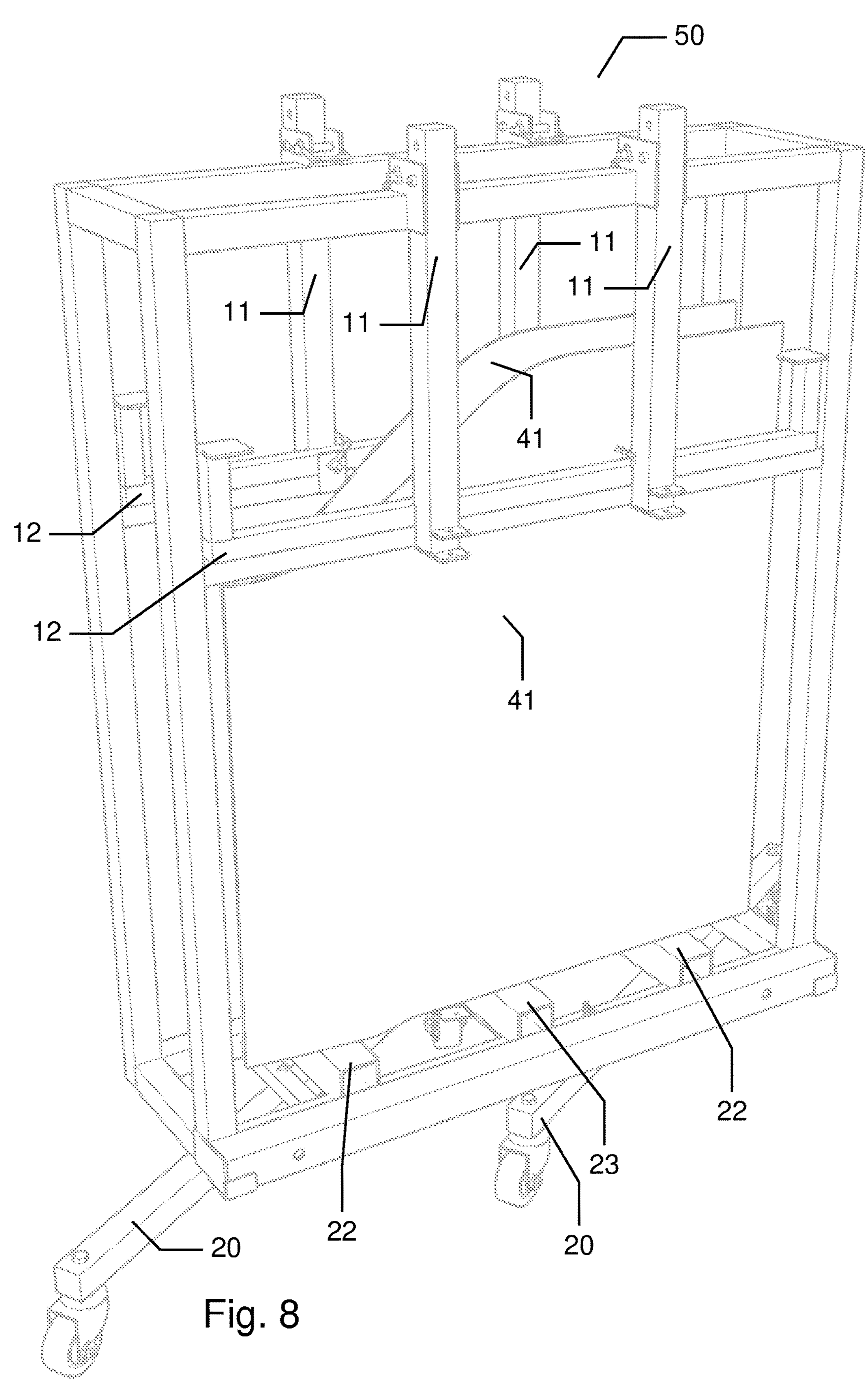
FIG. 8 is a perspective view of a vehicular doors and hardtop roof storage apparatus in the folded/compact configuration while also storing two removable hardtop roof panels and a possible multitude of trailer hitches.

When configured in the folded/compact configuration ready for self-storage or transportation as shown in FIGS. 3 and 4, removable hardtop roof panels 41 like Jeep "Freedom Panels" and trailer hitches and other hitch mounted accessories 42 may still be stored as shown on FIG. 8.

Figure 9:
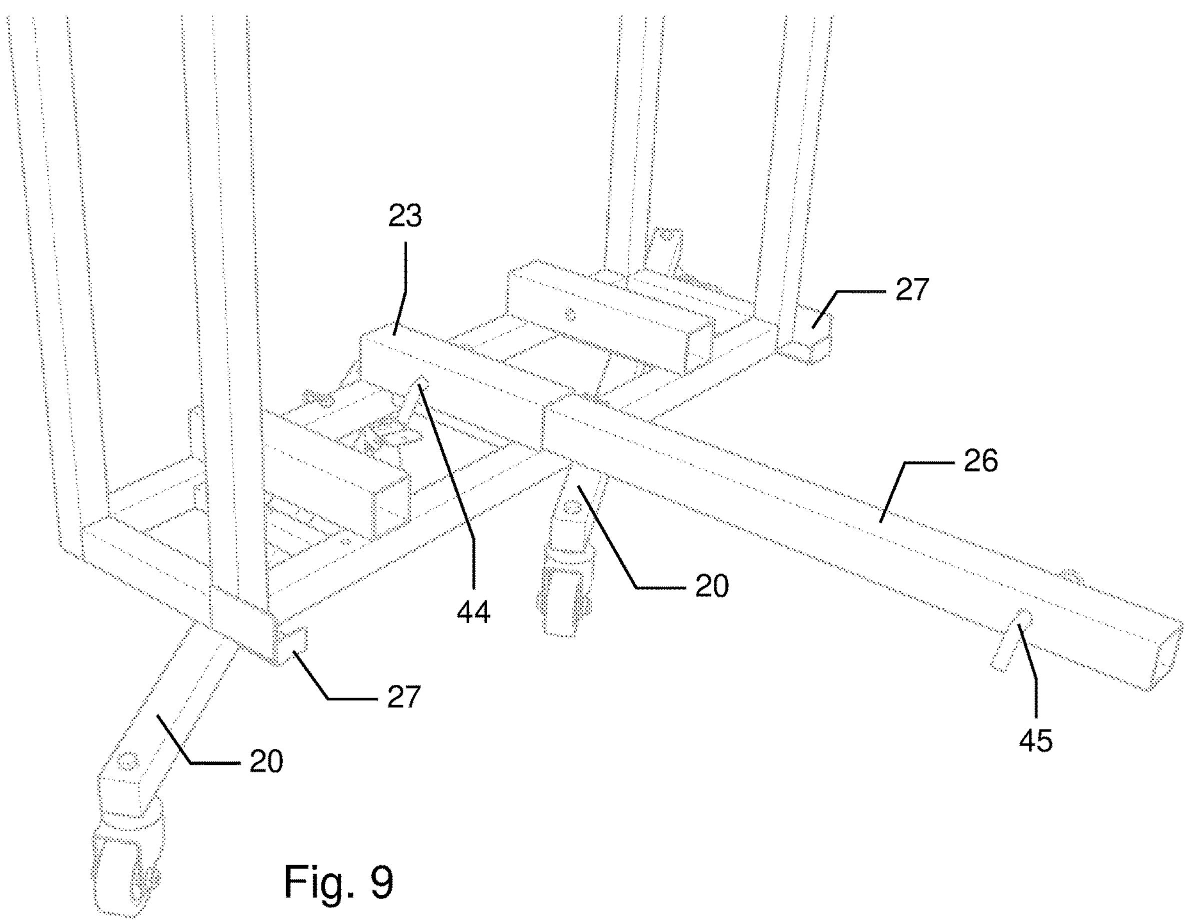
FIG. 9 is a partial perspective view of the bottom portion of a vehicular doors and hardtop roof storage apparatus with the vehicle transportation hitch bar installed in a manner that is ready for transport.
Figure 10:
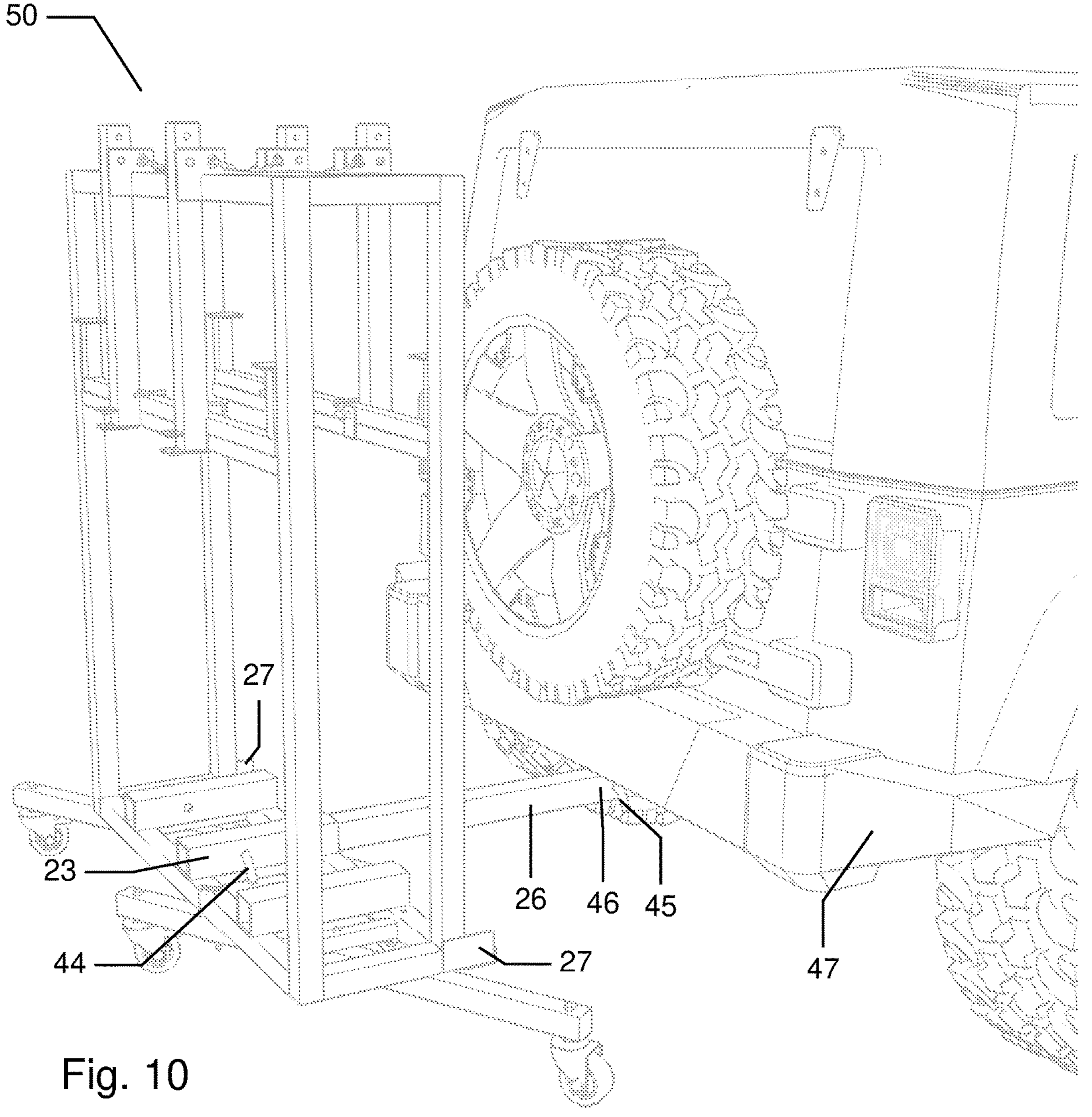
FIG. 10 is a perspective view of a vehicular doors and hardtop roof storage apparatus in the folded/compact configuration with the vehicle transportation hitch bar installed and shown to be in transport by a vehicle.

As shown in FIG. 9, complete configuration for transport via vehicle's 47 installed hitch 46 is achieved by removing transportation hitch tube 26 from the hitch tube cradle points 27 and telescopically placing inside the permanently affixed inner hitch and hitch accessory storage tube and transportation hitch point 23 and affixing with the apparatus hitch pin 44. The transportation hitch tube 26 is telescopically placed inside the vehicle's 47 installed hitch 46 and affixed with the vehicle hitch pin 45. The fully folded/compact configuration for transportation is shown in FIG. 10.

Having thus described a presently preferred embodiment of the present invention, it will now be appreciated that the objects of the invention have been fully achieved, and it will be understood by those skilled in the art that many changes in construction and widely differing embodiments and application of the invention will suggest themselves without departing from the spirit and scope of the present invention.

The invention claimed is:

1. A storage apparatus comprising:

a frame capable of housing individual removable vehicular roof components;

a set of door storage members secured to said frame;

a roof storage framework removably secured in a multitude of configurations, wherein said roof storage framework is comprised of individual members that may be removably secured on said door storage members; and a base upon which said frame is secured, wherein said base is comprised of individual members that are affixed to said frame such that they pivot about a point and may be secured in multiple positions.

2. A storage apparatus as in claim 1, wherein said door storage members are affixed to said frame such that they pivot about a point and can be secured in multiple positions.

3. A storage apparatus as in claim 1, wherein said frame contains an assembly of permanently affixed members for implementation of hitch devices.

4. A storage apparatus as in claim 1, wherein a transportation hitch tube may be removably secured to said frame in a multitude of configurations.

5. A storage apparatus as in claim 1, wherein said roof storage framework members may be removed from said door storage members and removably secured on said frame.

6. A storage apparatus as in claim 1, wherein said base comprises rollable casters.

7. A storage apparatus as in claim 1, wherein said individual members of said roof storage framework comprise removable hardtop roof storage brackets having vertical standoffs configured to support a removable vehicular hardtop roof.

8. A storage apparatus as in claim 1, wherein said individual members of said base are securable in an out-folded position for use of the apparatus and a folded position for compact storage or transportation of the apparatus.

9. A storage apparatus as in claim 8, wherein said individual members of said base include locking holes configured to align with corresponding locking holes of said frame in the out-folded position and in the folded position.

10. A storage apparatus as in claim 9, further comprising one or more locking members configured to selectively engage the aligned locking holes to secure the individual base members in the out-folded position and in the folded position.

11. A storage apparatus as in claim 3, wherein at least one of said permanently affixed members is configured to receive a removable transportation hitch tube.

12. A storage apparatus as in claim 4, wherein said transportation hitch tube is positionable in a first configuration for storage on the apparatus and in a second configuration for connecting the apparatus to a vehicle hitch.

13. A storage apparatus as in claim 1, wherein said apparatus is reconfigurable between an out-folded configuration for supporting removable vehicular doors and a removable vehicular roof component, and a folded configuration having a reduced footprint for storage or transportation.

* * * * *